(12) United States Patent
West

(10) Patent No.: US 9,394,997 B2
(45) Date of Patent: *Jul. 19, 2016

(54) AERODYNAMIC SEALING MEMBER FOR AIRCRAFT

(71) Applicant: AIRBUS OPERATIONS LIMITED, Bristol (GB)

(72) Inventor: Colin John West, Bristol (GB)

(73) Assignee: AIRBUS UK LIMITED, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/592,436

(22) Filed: Jan. 8, 2015

(65) Prior Publication Data

US 2015/0144741 A1 May 28, 2015

Related U.S. Application Data

(63) Continuation of application No. 12/349,054, filed on Jan. 6, 2009, now Pat. No. 9,004,404.

(30) Foreign Application Priority Data

Jan. 17, 2008 (GB) .................................. 0800770.0

(51) Int. Cl.
| | |
|---|---|
| *B64C 1/38* | (2006.01) |
| *F16J 15/10* | (2006.01) |
| *F16J 15/32* | (2016.01) |
| *B64C 9/14* | (2006.01) |

(52) U.S. Cl.
CPC ................. *F16J 15/104* (2013.01); *B64C 9/14* (2013.01); *F16J 15/108* (2013.01); *F16J 15/322* (2013.01); *Y10T 29/49826* (2015.01)

(58) Field of Classification Search
CPC ............................... F16J 14/104; F16J 15/322
USPC .......................................... 244/130, 131, 133
See application file for complete search history.

(56) References Cited

U.S. PATENT DOCUMENTS

| | | | | | |
|---|---|---|---|---|---|
| 3,288,667 | A | * | 11/1966 | Martin ............................. | 428/38 |
| 3,387,416 | A | * | 6/1968 | Martin ............................. | 52/208 |
| 3,766,591 | A | * | 10/1973 | Soito .............................. | 15/245 |
| 3,948,811 | A | * | 4/1976 | Clary et al. .................... | 252/514 |
| 4,126,911 | A | * | 11/1978 | Mohnach et al. ........... | 15/250.44 |
| 4,342,129 | A | * | 8/1982 | Thompson .................... | 15/250.4 |

(Continued)

FOREIGN PATENT DOCUMENTS

| | | |
|---|---|---|
| EP | 1676773 A1 | 7/2006 |
| EP | 1767837 A1 | 3/2007 |

(Continued)

OTHER PUBLICATIONS

UK Search Report for GB0800770.0 dated May 15, 2008.

*Primary Examiner* — Tien Dinh
*Assistant Examiner* — Steven Hawk
(74) *Attorney, Agent, or Firm* — Hauptman Ham, LLP

(57) ABSTRACT

A sealing member for forming a seal in an aircraft, the sealing member comprising: a sealing material; and a stiffening element which provides structural support to the sealing material and comprises a material with a glass transition temperature below +50° C. The stiffening element is relatively flexible when the aircraft is at low altitude (high temperature) but becomes relatively stiff (increasing resistance to seal flutter) when the aircraft is at cruise altitude (low temperature).

15 Claims, 4 Drawing Sheets

(56) References Cited

U.S. PATENT DOCUMENTS

| | | | | |
|---|---|---|---|---|
| 4,353,517 | A * | 10/1982 | Rudolph | 244/216 |
| 4,381,093 | A * | 4/1983 | Rudolph | 244/216 |
| 4,422,650 | A * | 12/1983 | Reinsma et al. | 277/384 |
| 4,434,959 | A * | 3/1984 | Rudolph | 244/215 |
| 4,567,621 | A * | 2/1986 | Alley, Jr. | 15/250.41 |
| RE32,907 | E * | 4/1989 | Rudolph | 244/215 |
| 5,178,348 | A * | 1/1993 | Bliesner | 244/212 |
| 5,208,939 | A * | 5/1993 | Oulie | 15/250.452 |
| 5,551,707 | A * | 9/1996 | Pauley et al. | 277/654 |
| 5,661,871 | A * | 9/1997 | Scorsiroli | 15/250.452 |
| 5,913,494 | A * | 6/1999 | Burbridge et al. | 244/213 |
| 5,991,568 | A * | 11/1999 | Ziegelmuller et al. | 399/102 |
| 6,543,785 | B1 * | 4/2003 | Katayama et al. | 277/534 |
| 6,575,407 | B2 * | 6/2003 | McCallum et al. | 244/133 |
| 6,655,635 | B2 * | 12/2003 | Maury et al. | 244/131 |
| 6,760,554 | B2 * | 7/2004 | Fina et al. | 399/102 |
| 6,814,541 | B2 * | 11/2004 | Evans et al. | 415/200 |
| 7,051,982 | B1 * | 5/2006 | Johnson | 244/215 |
| 7,134,163 | B2 * | 11/2006 | Varner | 15/245 |
| 7,258,347 | B2 * | 8/2007 | Keefe et al. | 277/628 |
| 7,422,177 | B2 | 9/2008 | Gomez | |
| 7,611,099 | B2 * | 11/2009 | Kordel et al. | 244/215 |
| 7,669,800 | B2 | 3/2010 | Hernandez | |
| 7,845,648 | B2 | 12/2010 | Keefe et al. | |
| 2003/0006344 | A1 * | 1/2003 | Pauly | 244/130 |
| 2003/0233722 | A1 * | 12/2003 | Sawamura et al. | 15/245 |
| 2006/0145012 | A1 * | 7/2006 | Hernandez | 244/130 |
| 2006/0145013 | A1 * | 7/2006 | Gomez | 244/130 |
| 2007/0088146 | A1 * | 4/2007 | Nakamura et al. | 528/44 |
| 2007/0228668 | A1 * | 10/2007 | Dempsey et al. | 277/627 |
| 2008/0121758 | A1 | 5/2008 | Hernandez | |
| 2009/0184477 | A1 * | 7/2009 | West et al. | 277/549 |
| 2009/0230632 | A1 * | 9/2009 | Petrash et al. | 277/584 |
| 2010/0111558 | A1 * | 5/2010 | Berg et al. | 399/101 |
| 2010/0288888 | A1 * | 11/2010 | Coconnier | 244/214 |

FOREIGN PATENT DOCUMENTS

| | | |
|---|---|---|
| GB | 2375149 A | 11/2002 |
| SU | 1733782 A1 | 5/1992 |

* cited by examiner

AERODYNAMIC SEALING MEMBER FOR AIRCRAFT

RELATED APPLICATIONS

The present application is a Continuation of U.S. application Ser. No. 12/349,054, filed Jan. 6, 2009, which claims priority from Great Britain Application No. 0800770.0, filed Jan. 17, 2008, the disclosures of which is hereby incorporated by reference herein in their entirety.

FIELD OF THE INVENTION

The present invention relates to a sealing member for forming an aerodynamic seal—that is, a seal which is exposed to the flow of air over an aircraft during flight.

BACKGROUND OF THE INVENTION

Seals are required at various points in an aircraft. When the seals are used to form an aerodynamic seal then they are exposed to air flow, which can induce a rapid movement of the seal known as 'seal flutter'. Seal flutter induces parasitic drag and negatively affects the performance of the aircraft. In modern aircraft, parasitic drag forms upwards of 12% of the total drag during cruise and there is consequently a focus on reducing these effects.

In existing seals, a strip of stiffening fabric material may be used to impart stiffness to the seal. However, if the seal is too stiff then it may be difficult to install and/or may be too stiff to maintain a seal at all times and/or may be unsuitable for forming an aerodynamic seal.

SUMMARY OF THE INVENTION

A first aspect of the invention provides a sealing member for forming an aerodynamic seal in an aircraft, the sealing member comprising a sealing material and a stiffening element which provides structural support to the sealing material and comprises a material with a glass transition temperature below +50° C.

In contrast to a conventional stiffening fabric (which typically has a glass transition temperature of 100s of ° C.), the stiffening element comprises a material with a relatively low glass transition temperature. As a result the stiffening element is relatively flexible when the aircraft is at low altitude (high temperature), but becomes relatively stiff—increasing the seal's resistance to flutter—when the aircraft is at cruise altitude (low temperature).

Preferably, the glass transition temperature of the material forming the stiffening element is below +20° C. and most preferably below −10° C. Typically the material forming the stiffening element has a glass transition temperature above −10° C., preferably above −40° C. and most preferably above −35° C. Typically the sealing material has a glass transition temperature which is lower than the glass transition temperature of the material forming the stiffening element.

A second aspect of the invention provides a sealing member for forming an aerodynamic seal in an aircraft, the sealing member comprising a sealing material and a stiffening element which provides structural support to the sealing material and which will stiffen to a greater degree than the sealing material in response to a decrease in temperature when the aircraft climbs from ground level to cruise altitude.

The second aspect of the invention provide a similar solution to the first aspect of the invention, but includes cases where the glass transition temperature of the stiffening element is greater than +50° C., or where the glass transition temperature is not well defined.

The stiffening element may stiffen to a greater degree than the sealing material in relative terms and/or in absolute terms.

Typically the stiffening element will stiffen to a greater degree than the sealing material in response to a decrease in temperature from +50° C. to −50° C., preferably from 0° C. to −40° C. and most preferably from −10° C. to −35° C.

Preferably, the sealing material is made from one elastomeric material and the stiffening element is made from another elastomeric material. In one possible implementation, the sealing material is silicone rubber, while the material used to form the stiffening element is polyurethane. However, any suitable polymers with suitable properties could be employed.

A further aspect of the invention provides a method of operating an aircraft, the method comprising forming an aerodynamic seal between the first and second components with the sealing member of the any of the previous aspects of the invention; moving the first component relative to the second component in order to adjust the aerodynamic behaviour of the aircraft; climbing from ground level to cruise altitude; and stiffening the stiffening element to a greater degree than the sealing material in response to a decrease in temperature when the aircraft climbs from ground level to cruise altitude.

A further aspect of the invention provides a method of manufacturing the seal of the first of second aspect of the invention, the method comprising compressing the sealing material and the stiffening element together; and curing the sealing material and/or the stiffening element as they are compressed together.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
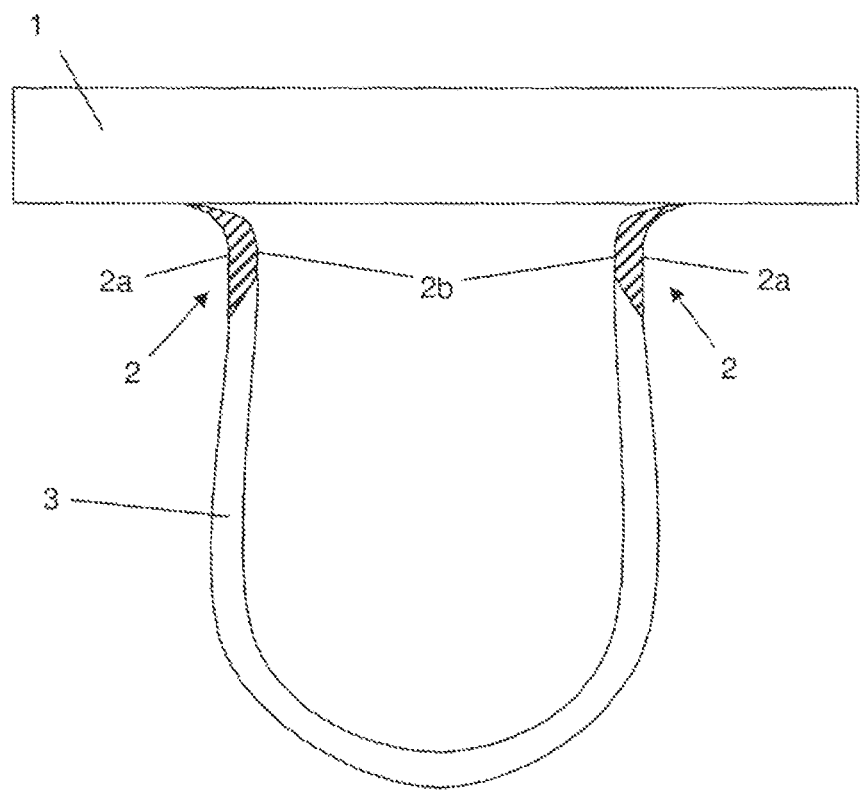
FIG. 1 shows a flap-track fairing connected to a wing of an aircraft, with a blade seal sealing the gap between the two structures.

FIG. 1 is a schematic sectional view of an aircraft wing 1 and a flap-track fairing 3. A blade seal 2 forms an aerodynamic seal between the two structures 1,3. The seal 2 has an outer face 2a forming art external aerodynamic surface of the aircraft, and an inner face 2b inside the fairing. The fairing 3 provides an aerodynamic surface which surrounds a flap deployment mechanism (not shown) to minimise the drag penalty associated with it. The flap deployment mechanism deploys a flap (not shown) from a retracted position to an extended position. The flap deployment mechanism also moves the fairing 3 down relative to the wing 1 as the flap moves to its extended position. Therefore the seal 2 must flex to enable it to expand and contract as the fairing moves, whilst maintaining a secure environmental seal between the fairing 3 and the wing 1.

During fitting of the fairing 3, an upwards force is exerted manually on the fairing 3 which causes the seal 2 to be compressed against the wing 1. The seal 2 must be sufficiently flexible to enable the fairing 3 to be lifted and mounted manually onto the wing by one or two people.

Figure 2:
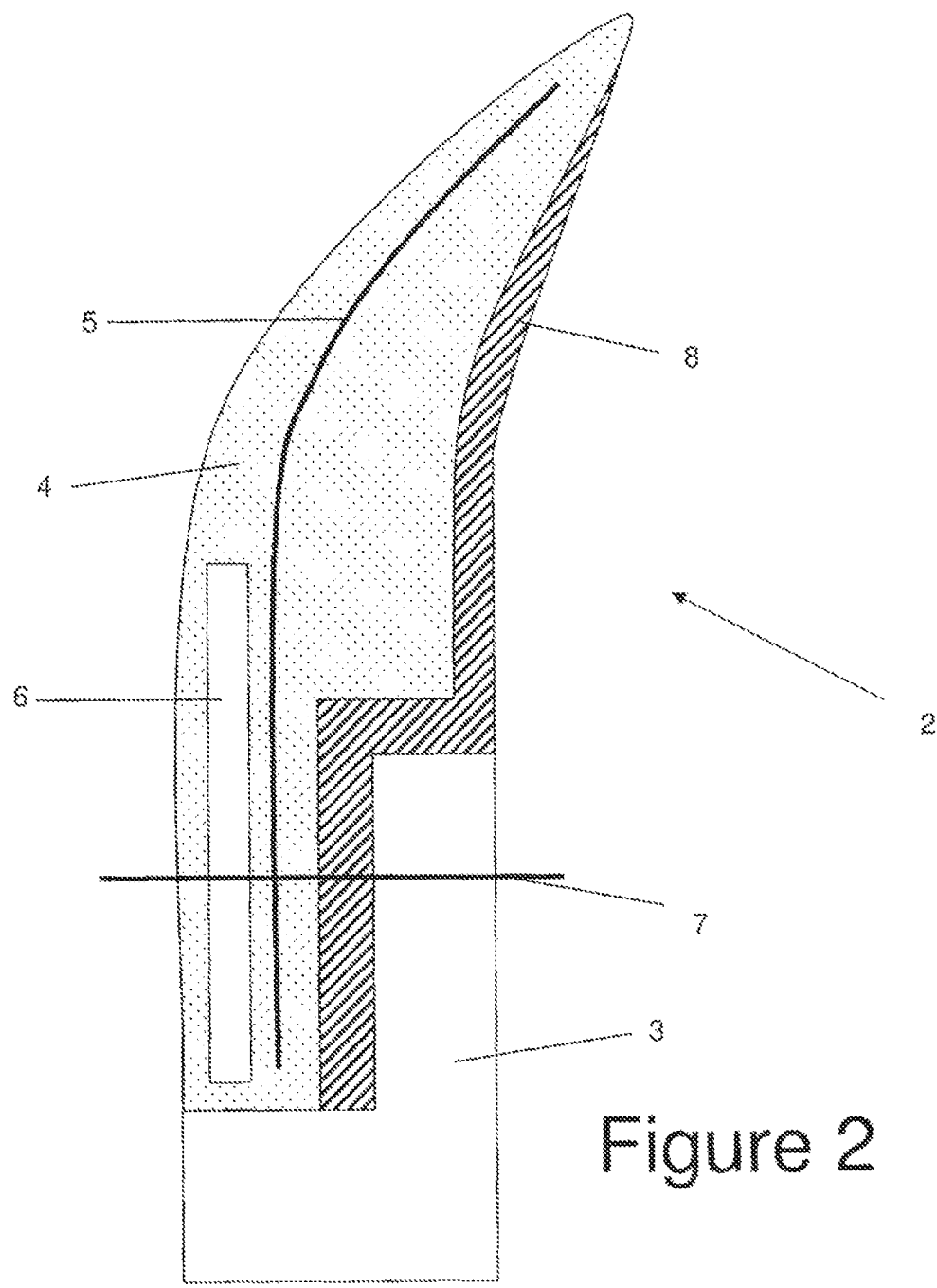
FIG. 2 shows a close-up view of the blade seal of FIG. 1.

An enlarged sectional view of the blade seal 2 is shown in FIG. 2. The blade seal 2 comprises: a silicone rubber sealing material 4, a fastener 7 securing the seal to the fairing 3; and a strip 6 of carbon-fibre reinforced pre-impregnated epoxy resin composite material ("pre-preg") providing reinforcement for the fastener hole.

During cruise of the aircraft, airflow over the seal can induce a rapid movement of the seal, known as 'seal flutter', which results in parasitic drag. A strip 5 of stiffening fabric material improves the resistance of the seal 2 to such seal flutter.

To complement the stiffening effect of the fabric material 5, a polyurethane stiffening element 8 is provided to provide further structural support to the sealing material 4. The polyurethane stiffening element 8 is positioned on the aerodynamic outer face 2a of the seal as it is more wear resistant than the silicone rubber sealing material 4. It is also less susceptible to accumulating potentially abrasive dirt particles during flight than the silicone rubber sealing material 4.

Figure 3:
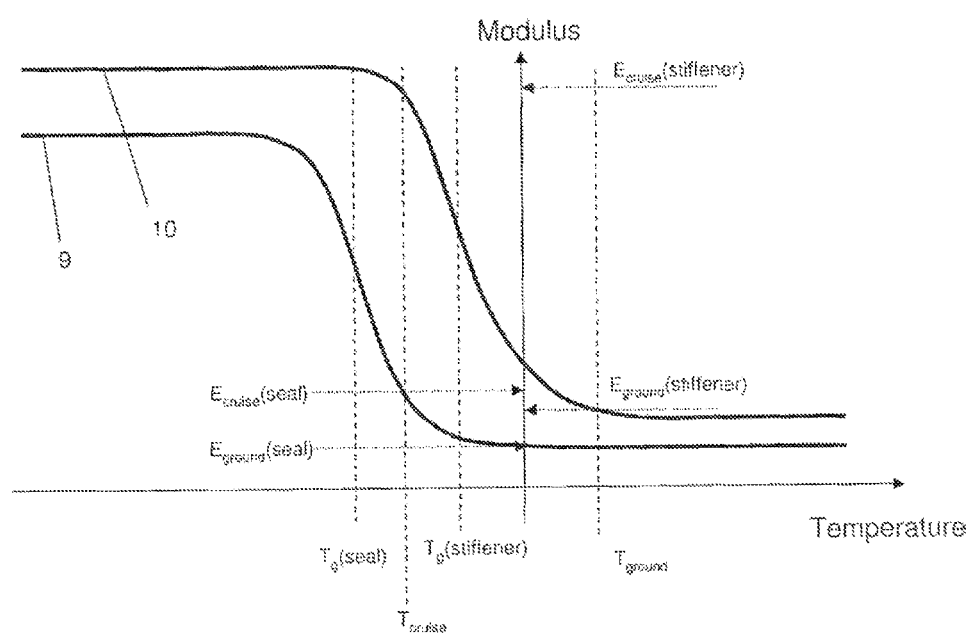
FIG. 3 shows stylised curves of stiffness vs. temperature for the two different materials used to form the sealing member.

FIG. 3 shows stylised and schematic modulus vs. temperature curves, 9, 10, for silicone rubber and polyurethane respectively. FIG. 3 also shows:

the glass transition temperature $T_g$(stiffener) for polyurethane (typically falling within the range of $-17°$ C. to $-35°$ C.);

the glass transition temperature $T_g$(seal) for silicone rubber (typically falling within the range of $-55°$ C. to $-57°$ C.);

air temperature $T_{cruise}$ at cruise (typically of the order of $-47°$ C.); and air temperature $T_{ground}$ on the ground (typically of the order of $20°$ C.)

Assuming that the temperature of the seal is the same as the air temperature, then the modulus of the stiffening element will increase from $E_{ground}$(stiffener) to $E_{cruise}$(stiffener), and the modulus of the sealing material will increase from $E_{ground}$(seal) to $E_{cruise}$(seal).

It can be seen from FIG. 3 that the polyurethane will stiffen to a greater degree than the silicone rubber as the aircraft climbs towards cruise altitude, in both absolute and percentage terms, that is:

$E_{cruise}$(stiffener)$-E_{ground}$(stiffener)$>E_{cruise}$(seal)$-E_{ground}$(seal); and $E_{cruise}$(stiffener)$/E_{ground}$(stiffener)$>E_{cruise}$(seal)$/E_{ground}$(seal)

Thus at cruise the stiffening element 8 becomes relatively stiff in order to reduce seal flutter, whilst the sealing material 4 remains relatively flexible in order to maintain a proper seal between the wing 1 and the fairing 3.

In FIG. 3 the four temperatures satisfy the following relationship:

$T_g$(seal)$<T_{cruise}<T_g$(stiffener)$<T_{ground}$

The glass transition temperature $T_g$(seal) of the sealing material lower than $T_{cruise}$ so that the sealing material 4 maintains its flexibility throughout all phases of-flight.

To ensure that the seal is sufficiently flexible to enable the flap track fairing to be manually fitted, preferably the air temperature $T_{ground}$ is higher than $T_g$(stiffener) during fitting of the fairing.

The lowest air temperature that is likely to be encountered by an aircraft on the ground when in service is approximately $-30°$ C., so in extreme cases the ground air temperature $T_{ground}$ may drop below $T_g$(stiffener). However, the air flow around the wing during take-off and landing typically causes the seal temperature to increase significantly above the air temperature. Furthermore, during take-off and landing phases the flaps are deployed from the wing 1. This causes the seal 2 to flex which in turn heats it up. These two effects ensure that in most cases the temperature of the seal 2 will be above the glass transition temperature $T_g$(stiffener) at low altitudes, including on the ground.

Silicone rubber is an appropriate choice for the sealing material 4. However, it should be noted that any other suitable elastomer with a similar glass transition temperature could be used.

Polyurethane is an appropriate choice of material for the stiffening element 8, and in this case (as illustrated in FIG. 3) $T_{cruise}$ is lower than $T_g$(stiffener). That is, the polyurethane becomes glass-like during cruise. However, polyurethane has a high cross-linking density so is relatively tough even below its glass transition temperature. This can be contrasted with a less suitable material like nitrite rubber which is likely to fracture if cooled below its glass transition temperature. Also, the fact that the stiffening element 8 is relatively thin compared with the sealing material 4 makes the stiffening element less prone to fracture at low temperatures.

Note that materials other than polyurethane may be used to form the stiffening element, including materials with either no well-defined glass transition temperature, or a glass transition temperature below $T_{cruise}$. The important point is that the material is chosen so as to stiffen to a greater degree than the sealing material (for instance as measured by the well known Gehman or $TR_{10}$ tests) in response to a decrease in temperature when the aircraft climbs from ground level to cruise altitude.

The stiffness of the seal 2 may vary periodically up and down along its length—the length of the seal being its dimension in and out of the plane shown m cross-section in FIGS. 1 and 2. This inhibits the development of harmonic resonances along the length of the seal. This can he done by periodically varying the relative thicknesses of the sealing material 4 and the stiffening element 8 over the length of the seal 2—i.e. the relative amount of sealing material 4 to stiffening element 8 varies along the length of the seal 2. Alternatively the stiffness of the seal 2 may be varied along its length without varying the relative thicknesses of the elements. This can be achieved by varying the composition of the material forming the stiffening element 8 and/or the sealing material 4 such that its modulus varies in a desired manner.

Figure 4:
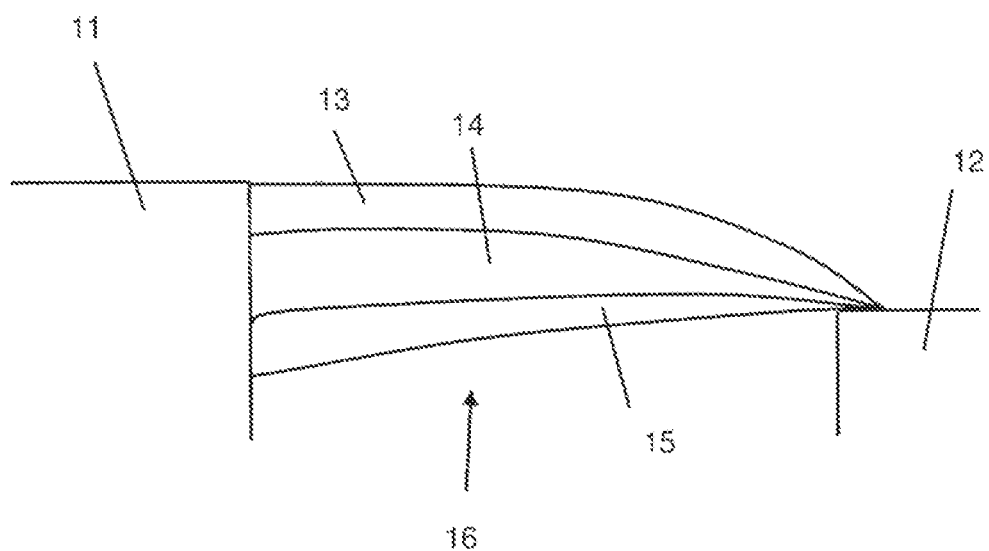
FIG. 4 shows an alternative seal design.

An alternative seal geometry is shown in FIG. 4. In this case, sealing member 16, comprising three layers 13, 14, 15, is used to form a seal between a first component 11 and a second component 12. The two outer layers 13, 15 are made from silicone rubber while the inner layer 14 is made from polyurethane. In the same way as the blade seal 2 shown in FIGS. 1 and 2, all three layers will be flexible at $T_{ground}$ and the silicone layers 13, 15 remain flexible through every phase of flight. The polyurethane layer 14 acts as a stiffening element during cruise to provide structural support to the sealing material 13, 15 and resist seal flutter.

In contrast to the seal 2 described above, the silicone sealing material 13,15 forms the outer surfaces of the seal. Although it is preferable in the seal 2 for the stiffening element 8 to form the outer layer of the seal 2 (as polyurethane is harder wearing than the silicone elastomer) the design of FIG. 4 requires that the outer layers be made from the sealing material 13, 15 to ensure that a proper seal is achieved at the point on the second component 12 where the three layers converge.

To manufacture the seals 2,16, the various elements are compressed together in a mould tool and cured as they are compressed together.

Although the invention has been described above with reference to one or more preferred embodiments, it will be appreciated that various changes or modifications may be made without departing from the scope of the invention as defined in the appended claims.

The invention claimed is:

1. An aircraft comprising first and second components; and a sealing member forming an aerodynamic seal between the first and the second components and is exposed to a flow of air over the aircraft during flight, the sealing member comprising:
   a sealing material; and
   a stiffening element which provides structural support to the sealing material and which will stiffen to a greater degree than the sealing material in response to a decrease in temperature when the aircraft climbs from ground level to cruise altitude, wherein the sealing member is secured to the first component and the sealing material is compressed against the second component to form the aerodynamic seal between the components, wherein the stiffening element forms an external aerodynamic surface of the aerodynamic seal.

2. An aircraft comprising first and second components; and a sealing member forming an aerodynamic seal between the components which is exposed to a flow of air over the aircraft during flight, the sealing member comprising:
   a sealing material; and
   a stiffening element which provides structural support to the sealing material and comprises a material with a glass transition temperature below +50° C.,
   wherein the sealing member is secured to the first component and the sealing material is compressed against the second component to form the aerodynamic seal between the components, wherein the stiffening element forms an external aerodynamic surface of the aerodynamic seal.

3. A method of operating the aircraft of claim 2, the method comprising:
   moving the first component relative to the second component in order to adjust an aerodynamic property of the aircraft;
   climbing from ground level to cruise altitude; and
   stiffening the stiffening element to a greater degree than the sealing material in response to a decrease in temperature when the aircraft climbs from ground level to cruise altitude.

4. The method of claim 3 further comprising reducing the stiffness of the stiffening element to a greater degree than the sealing material in response to flexure of the sealing member.

5. A method of manufacturing a sealing member for forming an aerodynamic seal in an aircraft, the sealing member comprising:
   a sealing material; and
   a stiffening element which provides structural support to the sealing material and comprises a material with a glass transition temperature below +50° C., the method comprising: compressing the sealing material and the stiffening element together; and curing the sealing material and/or the stiffening element as the sealing material and the stiffening element are compressed together, and wherein the stiffening element forms an external aerodynamic surface of the aerodynamic seal.

6. The aircraft of claim 2 wherein the stiffening element comprises a material with a glass transition temperature below +20° C.

7. The aircraft of claim 2 wherein the stiffening element comprises a material with a glass transition temperature above −50° C.

8. The aircraft of claim 2 wherein the sealing material has a glass transition temperature which is lower than the glass transition temperature of the material forming the stiffening element.

9. The aircraft of claim 2 wherein the stiffening element comprises a material which will stiffen to a greater degree than the sealing material in response to a decrease in temperature when the aircraft climbs from ground level to cruise altitude.

10. The aircraft of claim 2 wherein the stiffening element will stiffen to a greater degree than the sealing material in response to a decrease in temperature from +50° C. to −50° C.

11. The aircraft of claim 2 wherein the sealing material comprises an elastomeric material.

12. The aircraft of claim 2 wherein the stiffening element comprises an elastomeric material.

13. The aircraft of claim 2 wherein the sealing member forms a blade seal.

14. The aircraft of claim 2 further comprising an actuator for moving the first component relative to the second component in order to adjust an aerodynamic property of the aircraft.

15. The aircraft of claim 2 wherein the first component comprises a flap track fairing and the second component comprises a wing structure.

* * * * *